(12) United States Patent
Hecht et al.

(10) Patent No.: US 12,002,110 B1
(45) Date of Patent: *Jun. 4, 2024

(54) MULTI-SOURCE LIQUIDITY TRACKING

(71) Applicant: Wells Fargo Bank, N.A., San Francisco, CA (US)

(72) Inventors: Alan W. Hecht, Chanhassen, MN (US); Jeffrey A. Harmon, New Richmond, WI (US); Jane E. Guinnane, St. Paul, MN (US); Robert E. Lugenbeal, Brush Prairie, WA (US); Margaret O'Neill, Brooklyn Park, MN (US); Vicki L. Anderson, Big Lake, MN (US); Joel D. Feazell, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,605

(22) Filed: May 23, 2022

Related U.S. Application Data (63) Continuation of application No. 16/707,866, filed on Dec. 9, 2019, now Pat. No. 11,341,582, which is a continuation of application No. 15/282,975, filed on Sep. 30, 2016, now Pat. No. 10,572,951.

(60) Provisional application No. 62/236,679, filed on Oct. 2, 2015.

(51) Int. Cl.
*G06Q 40/12* (2023.01)
*G06Q 40/00* (2023.01)
*G06Q 40/02* (2023.01)

(52) U.S. Cl.
CPC .............. *G06Q 40/12* (2013.12); *G06Q 40/00* (2013.01); *G06Q 40/02* (2013.01)

(58) Field of Classification Search
CPC ........ G06Q 40/00; G06Q 40/02; G06Q 40/04; G06Q 40/12; G06F 15/18; G06F 17/00
USPC ............ 705/20, 30, 35, 36 R, 37, 38, 45, 46
See application file for complete search history.

(56) References Cited

U.S. PATENT DOCUMENTS

| | | | |
|---|---|---|---|
| 10,572,951 B1 | 2/2020 | Hecht et al. | |
| 11,341,582 B1 | 5/2022 | Hecht et al. | |
| 2004/0024692 A1* | 2/2004 | Turbeville | G06Q 40/08 705/38 |
| 2004/0225629 A1* | 11/2004 | Eder | G06N 5/022 706/45 |
| 2006/0184473 A1* | 8/2006 | Eder | G06N 5/022 706/20 |

(Continued)

OTHER PUBLICATIONS

Prosecution History from U.S. Appl. No. 15/282,975, now U.S. Pat. No. 10,572,951, dated Dec. 14, 2018 through Oct. 17, 2019, 76 pp.

(Continued)

*Primary Examiner* — Olusegun Goyea
(74) *Attorney, Agent, or Firm* — Shumaker & Sieffert, P.A.

(57) ABSTRACT

In an example, a computer implemented method includes obtaining respective transactional data from each financial data source of a plurality of financial data sources, where the respective transactional data is each associated with a posting time. The method also includes determining a net liquidity amount from the respective transactional data based on the posting time of each of the respective transactional data. The method also includes outputting net liquidity data that is representative of the determined net liquidity amount.

17 Claims, 7 Drawing Sheets

(56) References Cited

U.S. PATENT DOCUMENTS

| | | | |
|---|---|---|---|
| 2006/0235785 A1* | 10/2006 | Chait | G06Q 40/00 705/37 |
| 2007/0011071 A1* | 1/2007 | Cuscovitch | G06Q 40/00 705/35 |
| 2008/0015970 A1* | 1/2008 | Brookfield | G06Q 40/00 705/37 |
| 2011/0125672 A1* | 5/2011 | Rosenthal | G06Q 40/08 705/36 R |
| 2015/0134566 A1* | 5/2015 | Chen | G06Q 40/02 705/36 R |
| 2015/0142622 A1* | 5/2015 | Robertson | G06Q 40/12 705/30 |

OTHER PUBLICATIONS

Prosecution History from U.S. Appl. No. 16/707,866, now U.S. Pat. No. 11,341,582, dated Aug. 2, 2021 through Jan. 2, 2022, 54 pp.

* cited by examiner

GROUP DAILY BALANCE

| Group | Total Credits | Total Debits | Intraday Net Balance | Target Balance | Balance Indicator |
|---|---|---|---|---|---|
| Check Clearing | $10,000,000,000 | $1,200,000,000 | $9,800,000,000 | $7,500,000,000 | ↑ |
| ACH | $40,000,000,000 | $13,682,000,000 | $26,318,000,000 | $23,000,000,000 | → |
| Wire Transfer | $99,000,000,000 | $17,200,000,000 | $81,800,000,000 | $75,000,000,000 | ↓ |
| Securities | $40,000,000,000 | $3,800,000,000 | $36,200,000,000 | $33,000,000,000 | → |

FIG. 5A

SUB-GROUP DAILY BALANCE

| Sub-Group | Total Credits | Total Debits | Intraday Net Balance | Target Balance | Balance Indicator |
|---|---|---|---|---|---|
| CHIPS IFT | $50,000,000,000 | $10,000,000,000 | $40,000,000,000 | $30,000,000,000 | ↑ |
| CHIPS MTS | $60,000,000,000 | $20,000,000,000 | $40,000,000,000 | 35,000,000,000 | → |
| Fedwire Funds IFT | $9,000,000,000 | $8,000,000,000 | $1,000,000,000 | $5,000,000,000 | ↓ |
| Fedwire Funds MTS | $1,000,000,000 | $200,000,000 | $800,000,000 | $900,000,000 | → |
| Fedwire Securities | $7,000,000,000 | $7,000,000,000 | $0 | $900,000 | ↑ |

MULTI-SOURCE LIQUIDITY TRACKING

This application is a continuation of U.S. patent application Ser. No. 16/707,866, filed Dec. 9, 2019, which is a continuation of U.S. application Ser. No. 15/282,975, filed Sep. 30, 2016, now U.S. Pat. No. 10,572,951, which claims the benefit of U.S. Provisional Application No. 62/236,679, filed Oct. 2, 2015, the entire content of each of which is incorporated herein by reference.

TECHNICAL FIELD

The invention relates to data processing.

BACKGROUND

A financial institution may maintain a variety of accounts for providing financial services. For example, a financial institution may maintain a wire service, an automated clearing house, check issuing and receiving accounts, one or more international accounts, or the like. The financial institution may track balances in each of the accounts to determine an accounting liquidity based on the assets and obligations of the financial institution. In some instances, the financial institution may be responsible for reporting one or more measures of liquidity to a financial regulation authority.

SUMMARY

The techniques of this disclosure include obtaining transactional data from a plurality of financial data sources and determining a net liquidity amount from the transactional data. The techniques may be used to determine outstanding assets and liabilities of a financial institution using one or more computerized tools for gathering, organizing, analyzing, and/or presenting a large amount of transactional data. As described in greater detail below, in some instances, the techniques may provide enhanced granularity of transactions contributing to a measure of liquidity and a real-time or near real-time measure of liquidity.

In an example, a computer implemented method includes obtaining respective transactional data from each financial data source of a plurality of financial data sources, where the respective transactional data is each associated with a posting time. The method also includes determining a net liquidity amount from the respective transactional data based on the posting time of each of the respective transactional data. The method also includes outputting net liquidity data that is representative of the determined net liquidity amount.

In another example, a computing device includes a memory that is configured to store transactional data from each financial data source of a plurality of financial data sources, wherein the respective transactional data is each associated with a posting time and one or more processors. The one or more processors are configured to obtain the respective transactional data from each financial data source of the plurality of financial data sources, determine a net liquidity amount from the respective transactional data based on the posting time of each of the respective transactional data, and output a net liquidity data that is representative of the determined net liquidity amount.

In another example, a non-transitory computer-readable medium has instructions stored thereon that, when executed, cause one or more processors to obtain respective transactional data from each financial data source of a plurality of financial data sources, wherein the respective transactional data is each associated with a posting time, determine a net liquidity amount from the respective transactional data based on the posting time of each of the respective transactional data, and output net liquidity data that is representative of the determined net liquidity amount.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
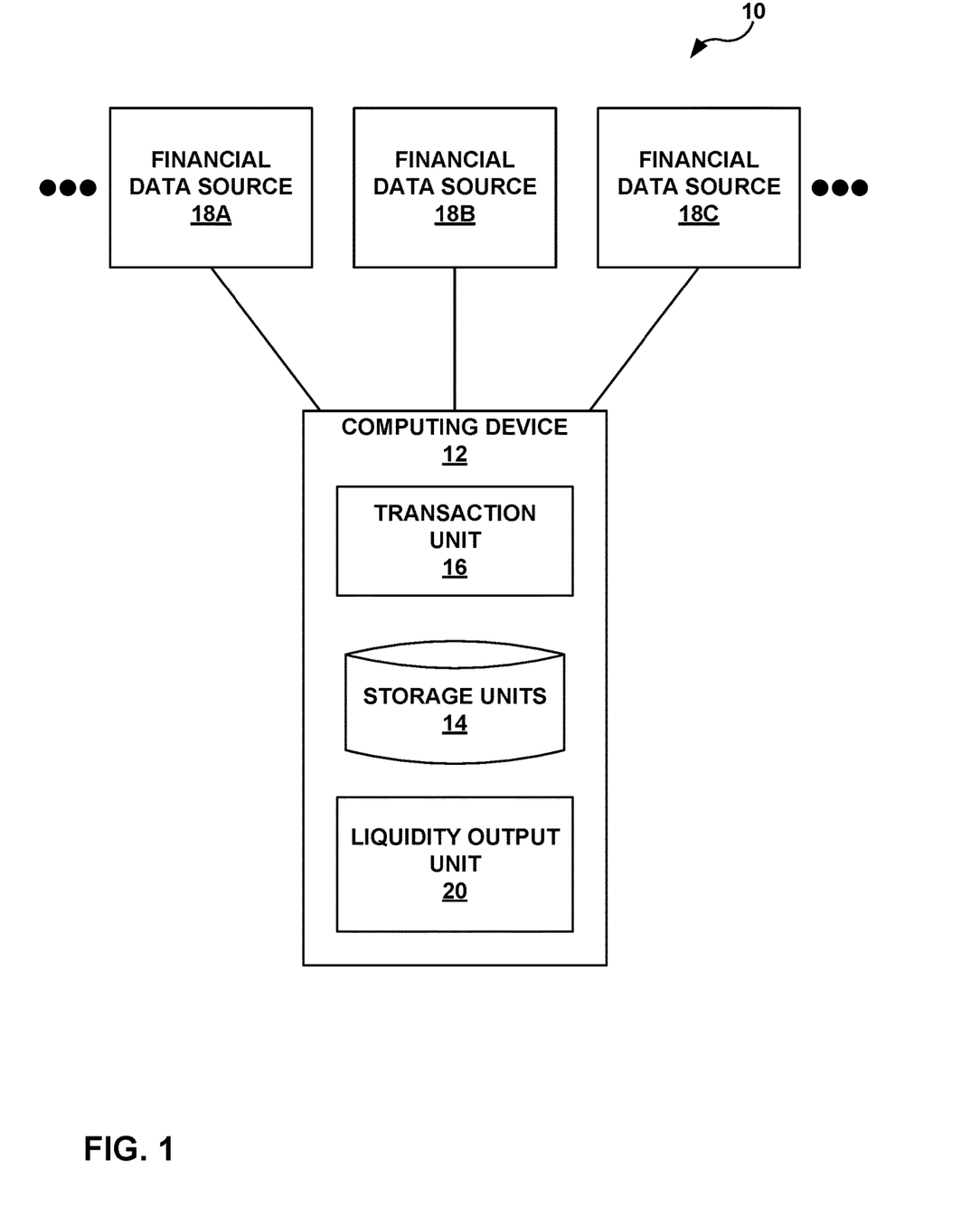
FIG. 1 is a block diagram illustrating an example computing system having a transaction unit configured to determine liquidity in accordance with the techniques of this disclosure.

FIG. 1 is a block diagram illustrating an example system 10 for tracking liquidity that includes a computing device 12 having storage units 14, a transaction unit 16, and a liquidity output unit 20. Computing device 12 receives information from a plurality of financial data sources 18A, 18B, and 18C (collectively, financial data sources 18) and transaction unit 16 determines net liquidity for output by liquidity output unit 20.

Computing device 12 may include a variety of devices for processing and/or manipulating data. For example, in general, the functionality of computing device 12 may be implemented in a device that includes one or more processing units, such as one or more microprocessors. The functionality of computing device 12 may be implemented in hardware or in a combination of software and hardware, where requisite hardware may be provided to store and execute software instructions. Such hardware may include, for example, a processing unit and a computer-readable storage medium. Other hardware may include digital signal processors (DSPs), application specific integrated circuits (ASICs), field programmable gate arrays (FPGAs), or any other equivalent integrated or discrete logic circuitry, as well as any combinations of such components. While shown as a single computing device in the example of FIG. 1 for purposes of illustration, in some examples, computing device 12 may include or participate in a distributed network of computing devices including one or more databases, file servers, and/or other computing devices.

Storage units 14 may store an operating system (not shown) that controls the operation of components of computing device 12. Storage units 14 may also be used by software or applications executed by computing device 12 to store information during program execution. Storage units 14 may include a computer-readable storage medium or computer-readable storage device. In some examples, storage units 14 include one or more of a short-term memory or a long-term memory. Storage units 14 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

Transaction unit 16 may include instructions executed by one or more processors of computing device 12 to perform the functions described with respect to transaction unit 16. Transaction unit 16 may be responsible for determining one or more measures of liquidity based on transactional data from financial data sources 18. For example, in some instances, computing device 12 may host (or may be included in a networked computing environment that hosts) one or more services associated with a financial institution. The financial institution may offer, as examples, financial services including commercial banking services, personal banking services (e.g., personal checking and savings accounts), brokerage services, international banking services, lending services (e.g., home loans, car loans, business loans, or student loans), or the like. As described herein, liquidity may generally refer to a measure of an ability to meet financial obligations with available assets (e.g., a measure of outstanding liabilities versus available assets or securities).

While not shown in the example of FIG. 1, computing device 12 may include one or more other components for carrying out the techniques described herein, such as one or more servers, other processors, storage units, or interfaces to communicate with external devices, input/output devices, or the like.

Financial data sources 18 may each be associated with respective sources of financial data, which may be referred to as financial accounts. For example, as noted above, computing device 12 may host one or more services associated with a financial institution that offers different lending products, such as home loans, car loans, business loans, student loans, and the like. Financial accounts may be maintained for facilitating transactions associated with the one or more services. For example, financial accounts may include a federal securities account, one or more payment broker accounts, one or more international funds accounts, a check debit account for receiving checks to be settled by the financial institution, a check credit account for receiving checks to be settled by another financial institution, an automated clearing house (ACH) account for direct deposit or other ACH transactions, and/or a variety of other accounts.

In some instances, financial data sources 18 may each be maintained by one or more computing devices that are separate from computing device 12. For example, financial data sources 18 may maintain financial account data on a number of servers, which may include arrays of processing units and/or computer-readable storage medium. In some examples, such servers may include any combination of application servers, web servers, computing servers, database servers, file servers, media servers, communications servers, or another other computing device capable of sharing processing resources and/or data with other computing devices. Hence, in some instances, the financial data of the respective financial data sources 18 may be associated with a variety of different file formats for representing transactions.

Liquidity output unit 20 may be responsible for outputting liquidity data generated by transaction unit 16. Liquidity output unit 20 may include instructions executed by one or more processors of computing device 12 to perform the functions described with respect to liquidity output unit 20. In addition, in some examples, liquidity output unit 20 may include a display for presenting one or more graphical user interfaces generated by computing device 12. For example, as described in greater detail below, liquidity output unit 20 may present one or more graphs, charts, or other visual representations of a variety of measures of liquidity for a financial institution. While shown as part of computing device 12 for purposes of illustration, in some examples, liquidity output unit 20 may be a separate component from computing device 12. For example, computing device 12 may be comprised of one or more servers configured to generate liquidity data, while liquidity output unit 20 may be incorporated in a separate terminal or computing device that is configured to output the liquidity data.

Computing device 12, financial data sources 18 and liquidity output unit 20 may be connected via wired and/or wireless links. For example, the links may form part of a packet-based network, such as a local area network, a wide-area network, or a global network such as the Internet. The links may include routers, switches, base stations, or any other equipment that may be useful to facilitate communication between computing device 12, financial data sources 18 and liquidity output unit 20. The links may also include financial data sources 18 to be maintained on one or more computing systems that are separate from computing device 12.

As noted above, computing device 12 may receive and process a variety of financial data from a variety of financial data sources 18 associated with one or more financial institutions. Depending on the size and/or services offered by the financial institution, the number of sources of the financial data may be relatively large. Moreover, the amount of data received by computing device 12 may be relatively large. Further, computing device 12 may receive transactional data in a variety of different formats (e.g., computerized file formats). The number of sources, amount of data, format of data, timing, and/or other factors may present challenges in determining outstanding assets and liabilities of the financial institution, e.g., for determining one or more measures of liquidity for the financial institution.

This disclosure includes techniques that allow computing device 12 to obtain respective transactional data from a plurality of financial data sources 18 and determine a net liquidity amount from the transactional data. In some examples, this disclosure provides a technical solution to the above described issue of determining outstanding assets and liabilities of a financial institution using one or more computerized tools for gathering, organizing, analyzing, and/or presenting a large amount of transactional data. As described in greater detail below, in some instances, the techniques may provide enhanced granularity of transactions contributing to a measure of liquidity and a real-time or near real-time measure of liquidity for a financial institution.

The techniques of this disclosure may, in some examples, be used to determine a net liquidity for one or more accounts. In some examples, the net liquidity may be an intraday net liquidity. For example, a financial institution may actively manage intraday liquidity positions and risks to meet payment and settlement obligations on a timely basis under a variety to conditions, thereby helping to ensure the functioning of payment and settlement systems. According to aspects of this disclosure, as an example, transaction unit 16 may determine an intraday net liquidity for a federal banking account held by a financial institution.

While certain techniques are described herein with respect to a federal banking account, in other examples transaction unit 16 may determine an intraday net liquidity for commercial accounts, personal checking and savings accounts, federally insured accounts (e.g., insured by the Federal Deposit Insurance Corporation (FDIC)), or other types of accounts. According to some aspects, the techniques may be used to monitor credit extended and obtained by a financial institution, and may include an ability to systematically adjust credit limits provided to customers within legal entities, types and sources. According to other aspects, the techniques may be used to monitor collateral by legal entity, jurisdiction, and/or currency.

In any event, transactional data may be associated with a posting time. For example, as described in greater detail below, transactions of different account types may be posted (e.g., applied to outstanding debts or credits) to the accounts at various times throughout a given day. Some transactions may post in real-time or near real-time (e.g., upon the transaction occurring or within a set time of the transaction occurring, such as a number of seconds or minutes), while other transactions may post to a particular account at a specified time. Hence, respective transactional data may each be associated with a posting time.

According to aspects of this disclosure, transaction unit 16 may determine a net liquidity amount from the transactional data based on the posting time of the respective transactional data. For example, for transactions that post in real-time or near-real time, transaction unit 16 may include such transactions in the net liquidity amount in real-time or near real-time. In some instances, computing device 12 may receive an indication of a transaction associated with one or more of financial data sources 18 prior to the transaction posting. In such instances, transaction unit 16 may not include such transactions in the net liquidity amount until the transactions post. Hence, at a given time of day, transaction unit 16 may determine a net liquidity amount based only on transactions that have posted at the given time and not based on transactions that have occurred but not yet posted.

Transaction unit 16 may determine the net liquidity amount by aggregating transactional data received from financial data sources 18. For example, transaction unit 16 may credit payments made to the financial institution and deduct liabilities owed by the financial institution. Transaction unit 16 may use the transactional data to determine any measure of liquidity (e.g., net assets, liquidity ratios, or the like).

In some examples, the techniques may provide a per-transaction level of granularity. For example, transactional data from financial data sources 18 may include data associated with a number of individual transactions. In this example, transaction unit 16 may determine the net liquidity amount based on each transaction. In other examples, transactional data from financial data sources 18 may include one or more sub-totals of already aggregated transactions.

Transaction unit 16 may, in some examples, obtain respective intraday transactional data and may determine an intraday net liquidity amount. In an example for purposes of illustration, transaction unit 16 may obtain or determine an initial balance of a particular account. As transactions are executed throughout a day, transaction unit 16 may obtain transactional data from financial data sources 18 and apply the transactions of the transactional data to the initial balance based on a posting time of the transactional data. In this example, transaction unit 16 may provide a real-time or near real-time output of the account balance throughout the day to liquidity output unit 20.

According to aspects of this disclosure, transaction unit 16 may maintain one or more threshold liquidity amounts. For example, transaction unit 16 may be configured to track the determined net liquidity relative to a static or variable liquidity threshold. In this example, transaction unit 16 may be configured to issue an alert (e.g., generate a computerized message, such as an email, text message, or other communication) based on a comparison of the determined net liquidity to the threshold. That is, transaction unit 16 may issue one or more alerts based on the determined net liquidity rising above or falling below a determined threshold. In an example, the threshold may be an intraday threshold liquidity amount. While described with respect to transaction unit 16, in other examples, liquidity output unit 20 may be responsible for issuing and/or presenting such alerts.

In some examples, the above-described liquidity thresholds may be static (e.g., the same each day). In other examples, transaction unit 16 may determine an intraday liquidity threshold for an account based on an opening balance of the account. In still other examples, transaction unit 16 may determine an intraday liquidity threshold (or other threshold) based on historical data for a given period (e.g., based on data for the previous day, week, month, year, or the like). In such examples, transaction unit 16 may specify a intraday liquidity threshold for a single day that is based on historic data over a number of days. Transaction unit 16 may apply any combination of thresholds to monitor the net liquidity of one or more accounts maintained by computing system 12.

According to aspects of this disclosure, transaction unit 16 may generate one or more graphical user interfaces (GUIs) that allow a user to view the determined net liquidity (e.g., a graph of the determined net liquidity) and/or view transactional data from financial data sources 18 that contributes to a particular net liquidity amount (e.g., as shown in the examples of FIGS. 4A-5B). In some examples, transaction unit 16 may present per-transaction level granularity of transactional data contributing to the determined net liquidity amount. For example, transaction unit 16 may generate a GUI that allows a user to select particular groups of accounts, sub-accounts, and/or individual transactions for viewing and/or analysis. Again, while described with respect to transaction unit 16, in other examples, liquidity output unit 20 may be responsible for generating and presenting such GUIs.

In some examples, transaction unit 16 may obtain transactional data from financial data sources 18 in a variety of different formats. For example, transaction unit 16 may obtain transactional data that is formatted in HTML, MQ messages, network data mover (NDM) or a variety of other computer formats for files/messages containing the transactional data. According to aspects of this disclosure, transaction unit 16 may convert the obtained transactional data to a single format prior to determining the net liquidity amount. For example, transaction unit 16 may convert data received from financial data sources 18, convert the data to a common format, and store the converted data to storage units 14. Transaction unit 16 may determine the net liquidity amount and/or generate the above-described GUIs based on the data stored to storage units 14.

Figure 2:
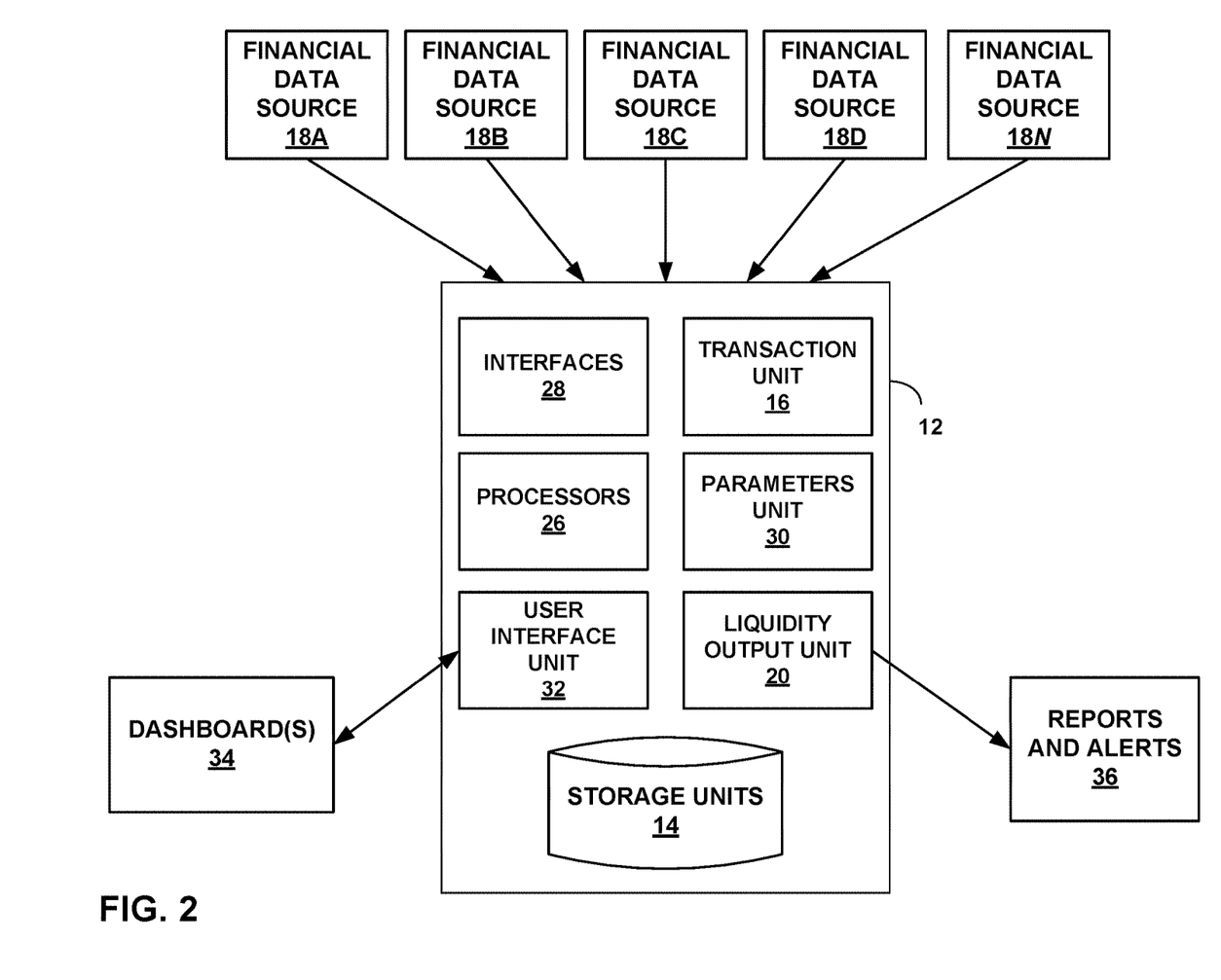
FIG. 2 is a conceptual diagram illustrating a system for determining liquidity in accordance with the techniques of this disclosure.

FIG. 2 is a conceptual diagram illustrating computing device 12 in greater detail. As noted above, computing device 12 receives financial data (such as data associated with financial data sources 18) from financial data sources 18A-18N (collectively, financial data sources 24). Computing device 12 includes transaction unit 12, storage units 14, and liquidity output unit 20, as well as processors 26, interfaces 28, parameters unit 30, and user interface unit 32. Again, it should be understood that the example shown in FIG. 2 is provided for purposes of illustration, and other examples of computing device 12 may include additional, fewer, or a different arrangement of components than those shown.

Processors 26, in one example, are configured to implement functionality and/or process instructions for execution within computing device 12. For example, processors 26 may be capable of processing instructions stored by storage units 14. Processors 26 may include, for example, microprocessors, digital signal processors (DSPs), application specific integrated circuits (ASICs), field-programmable gate array (FPGAs), or equivalent discrete or integrated logic circuitry.

Storage units 14 may store program instructions for execution by processors 26. For example, storage units 14 may store an operating system (not shown) that controls the operation of components of computing device 12. Storage units 14 may also be configured to store information within computing device 12 during operation. Storage units 14 may be used by software or applications (e.g., transaction unit 16) running on processors 26 to temporarily store information during program execution.

Storage units 14 may also comprise a database for storing transactional data received from financial data sources 18. In some examples, storage units 14 may separately store certain types of transactional data. For example, storage units 14 may store transactional data associated with a federal securities account separately from data associated with commercial and/or personal checking, savings, and/or credit accounts. As described in greater detail below, storage units 14 may store the transactional data in the format in which the data has been received and/or a converted format.

Computing device 12 may use interfaces 28 to communicate with external devices (such as devices associated with financial data sources 18) via one or more wired or wireless connections. Hence, interfaces 28 may provide an interface to receive transactional data from financial data sources 18. In some examples, computing device 12 utilizes interfaces 28 to communicate with external devices. Interfaces 28 may be network interfaces cards, universal serial bus (USB) interfaces, optical interfaces, or any other type of interfaces capable of sending and receiving information via TCP/IP. Examples of such network interfaces may include Ethernet, Wi-Fi, or Bluetooth radios.

As noted above, financial data sources 18 may be associated with a wide variety of financial services providers and may provide a wide variety of transactional data. Examples of financial data sources 18 include a federal securities payment broker, an MTS payment broker, an international funds transfer account, a check debit account for receiving checks to be settled by the financial institution (Chx2000), a check credit account for receiving checks to be settled by another financial institution (Image Receive), DTC account, an ACH account, commercial and/or personal checking and savings accounts, and a data distributor. The data distributor may receive amount and/or transactional data from one or more sources external to the financial institution that maintains computing device 12. In other examples, transactional data sources 18 may include more or fewer sources than those shown in FIG. 2.

Parameters unit 30 may be responsible for manipulating transactional data received from financial data sources 18. For example, parameters unit 30 may receive the transactional data in a variety of different data formats. Parameters unit 30 may convert the received transactional data to a single format that may be operated on by the intraday liquidity engine. Parameters unit 30 may store the converted data to storage units 14.

Parameters unit 30 may also maintain a variety of data acquisition and/or analysis parameters for generating and/or analyzing liquidity amounts. For example, parameters unit 30 may determine posting times of different transactions, the types of transactions contributing to a particular liquidity calculation, and/or other parameters. In some examples, parameters unit 30 may store tables of transaction data and/or posting times to storage units 14, and transaction unit 16 may use such data to determine liquidity amounts.

For example, Table 1 below includes posting times for various transactions that may be used to determine liquidity in accordance with the techniques of this disclosure. In the example below, two accounts maintained by a financial institution post credits and debits in real-time or near real-time, while other accounts post transactions at various times throughout a given day.

TABLE 1

| PAYMENT TYPE | TIME | SOURCE |
| --- | --- | --- |
| Fedwire Funds-21.5 hours-21:00 ET-18:30 ET (Sun thru Fri) | Real-time | MTS and IFT |
| Fedwire Securities hours-8 hrs-8:30 ET-16:30 ET (Mon thru Fri) | Real-time | Fed Auto (Trust Application) |
| Term Deposit Maturities & Interest | 8:30 | PMD |
| FedACH credits | 8:30 | ACH application |
| FedACH debits | 8:30 | ACH application |
| Fed Clearings-credits | 8:30 | CK outgoing |
| Fed Clearings-debits | 8:30 | EC incoming |
| EPN Morning | 8:32 | ACH application |
| Viewpointe-Exchange #160 | 9:06 | CK outgoing/EC incoming |
| FICC MBS (Early) | 10:01 | TDCS (mortgage application) |
| Viewpointe-Exchange 139 | 10:08 | CK outgoing/EC incoming |
| SVPCO ESS | 12:07 | EC outgoing & incoming |
| SVPCO Image Noon | 12:08 | CK outgoing/EC incoming |
| Fed Clearings-credits | 13:00 | CK outgoing |

TABLE 1-continued

| PAYMENT TYPE | TIME | SOURCE |
| --- | --- | --- |
| Fed Clearings-debits | 13:00 | EC incoming |
| Viewpointe-Exchange #35 | 13:20 | CK outgoing/EC incoming |
| Viewpointe-Exchange #151 | 13:20 | CK outgoing/EC incoming |
| Viewpointe-Exchange #153 | 13:20 | CK outgoing/EC incoming |
| Viewpointe-Exchange #146 | 13:20 | CK outgoing/EC incoming |
| SVPCO Online (SST) | 14:01 | EC incoming |
| FICC MBS (Late) | 14:31 | TDCS (mortgage application) |
| Viewpointe-Exchange #101 | 15:09 | CK outgoing/EC incoming |
| Viewpointe-Exchange #147 | 16:06 | CK outgoing/EC incoming |
| Viewpointe-Exchange #154 | 16:06 | CK outgoing/EC incoming |
| SVPCO Image PM | 16:09 | CK outgoing/EC incoming |
| SVPCO ESS | 16:10 | EC outgoing & incoming |
| EPN Sameday | 16:16 | ACH application |
| DTCC/NSCC-final settlement | 16:18 | Trust Ops |
| ACAP-Automated Claims Adjustment Process | 16:31 | Trust Ops |
| Fed Clearings-credits | 17:00 | CK outgoing |
| ACH adjustment/same day | 17:00 | ACH application |
| Fed Clearings-credits | 17:30 | CK outgoing |

According to aspects of this disclosure, transaction unit 16 may determine a net liquidity amount based on a posting time associated with the plurality of the accounts shown in Table 1. For example, transaction unit 16 may use one or more tables (e.g., Table 1) to determine when to apply transactions associated with a given account to a liquidity amount determined at a particular time. In an example for purposes of illustration, at 9:30, the transaction unit 16 may determine a net liquidity amount based on the two real-time accounts at the top of Table 1 and the seven accounts that have transactions posting prior to 9:30. Transaction unit 16 may not include transactions associated with the remaining 23 accounts in the net liquidity amount determined at 9:30 (regardless of whether transactional data is available for such accounts), because those transactions have not yet posted.

The example of FIG. 2 also includes one or more dashboards 34 and reports and alerts 36. While illustrated as separate components in the example of FIG. 2 for purposes of illustration, it should be understood that such components may be incorporated as a single component. For example, as described below, dashboards 34 may include a GUI that allows a user to select particular information for display or implement one or more thresholds for reports and alerts 36. For instance, user interface unit 32 may generate dashboards 34, which may include one or more GUIs that allow a user to select the transactional data and/or liquidity amounts for which to generate reports and alerts 36.

In some examples, one or more dashboards 34 may be used to group certain transactions for viewing/analysis by a user. The groups may be configurable by the user. In an example for purposes of illustration, one of dashboards 34 may include transactional data of a wire transfer group. Dashboards 34 may additionally or alternatively be used to display transactional data for a sub-group of a particular type of wire transfers. Dashboards 34 may additionally or alternatively be used to display individual transactions for a particular wire transfer account within the sub-group. User interface unit 32 may generate dashboards 34 to present such hierarchical data for each data source of financial data sources 18.

In some examples, dashboards 34 may be used to apply a plurality of filters for refinement of a particular query. For example, filters may include a beginning of a posting time, an end of a posting time (e.g., to capture transactions occurring between the beginning time and ending time), a transaction amount range, and a sub-group (e.g., in instances in which a particular account group, such as a wire transfer account group, includes sub-groups). In some instances, sub-group data may be even further refined to transaction level data.

Transactional data contributing to a particular liquidity determination may be filtered by time. For example, since there may be a very large number of transactions associated with a wire transfer query, dashboards 34 may be used to filter transactions for a particular time increment (e.g., 10 minutes, 30 minutes, or the like). Liquidity output unit 20 may export results to a particular file format (e.g., a spreadsheet) as reports and alerts 36 for further analysis. While the example described above is described in the context of wire transfers, it should be understood that the techniques may also be applied to configure and/or display information about other account types (e.g., ACH, check clearing accounts, nostro accounts (e.g., accounts held in a foreign country by a domestic financial institution, denominated in the currency of that country), securities accounts, or the like).

According to aspects of this disclosure, liquidity output unit 20 may implement one or more transaction and/or liquidity thresholds. For example, liquidity output unit 20 may generate reports and alerts 36 based on a determined transaction amount/type and/or liquidity rising above or falling below a determined threshold. Liquidity output unit 20 may determine net liquidity amounts and/or other financial data for particular groups or sub-groups of transactional data sources 34.

While certain aspects are described herein with respect to liquidity, in some instances, the techniques may be used to monitor credit extended and obtained by a financial institution, and may include an ability to systematically adjust credit limits provided to customers within legal entities, types and sources. For example, one or more of financial data sources 18 may be associated with credit accounts (extended and obtained) by a financial institution. The balance of the credit may fluctuate over a period of time. According to aspects of this disclosure, transaction unit 16 may make periodic outstanding credit determinations based on data received by financial data sources 18 and may monitor the credit relative to one or more credit limits.

According to other aspects, the techniques may be used to monitor collateral by legal entity, jurisdiction, and/or currency. For example, one or more of financial data sources 18 may be associated with collateral being held by a financial institution. Such collateral may fluctuate over a period of time. According to aspects of this disclosure, transaction unit 16 may make periodic collateral determinations based on data received by financial data sources 18 and may monitor the collateral determinations relative to one or more thresholds.

Figure 3:
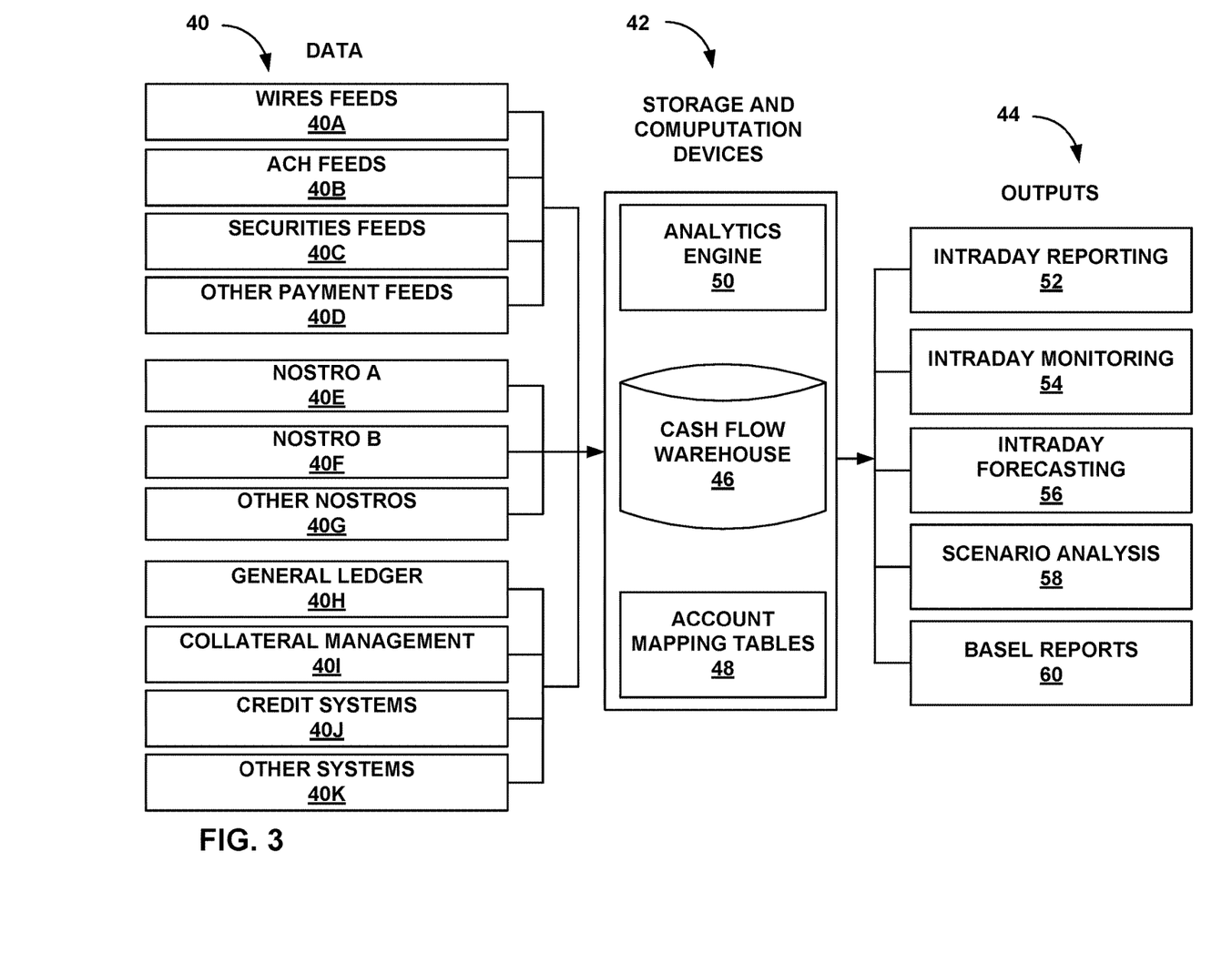
FIG. 3 is another conceptual diagram illustrating a system for determining liquidity in accordance with the techniques of this disclosure.

FIG. 3 is another conceptual diagram illustrating a system for determining liquidity in accordance with the techniques of this disclosure. The system shown in the example of FIG. 3 includes data sources 40, storage and computation devices 42, and outputs 44. In some examples, the components shown in FIG. 3 may relate to components shown in the example of FIG. 1. In an example, data sources 40 may correspond to financial data sources 18, storage and computation device 44 may be incorporated in computing device 12, and outputs 48 may be generated by liquidity output unit 20.

In the example of FIG. 3, data sources 40 include a variety of financial data sources. For example, data sources 40 include wire feeds 40A, automated clearing house (ACH) feeds 40B, securities feeds 40C, other payment feeds 40D, nostro accounts 40E-40G, general ledger accounts 40H, collateral management accounts 40I, credit systems 40J, and other systems 40K. Transactions of each of the data financial sources may post to a particular financial institution at different times throughout a given day (e.g., as illustrated in Table 1 above). Data from data sources 40 may be transmitted to storage and computation devices 44 in a variety of different formats.

In the example of FIG. 3, storage and computation devices 44 includes a cash flow warehouse 46, account mapping tables 48, and an analytics engine 50. Cash flow warehouse 46 may include one or more databases that store transactional data from data sources 40. Analytics engine 50 may be comprised of a combination of hardware and/or software components, and may modify the format of data using account mapping tables 48 prior to storing the transactional data from data sources 40.

In an example for purposes of illustration, storage and computation devices 44 may receive data from data sources 40 in a variety of different formats at different times throughout a given day. For example, storage and computation devices 44 may receive data in a fixed file having multiple records of transactions, data representing one transaction at a time, data having a particular format (e.g., XML format), or the like. Analytics engine 50 may parse each field of received data and store the data to cash flow warehouse 46, e.g., in one or more database tables.

To appropriately parse and store the received data, analytics engine 50 may determine to which source of data sources 40 that received data corresponds. Analytics engine 50 also determines whether the transaction(s) represented by the received data are credits or debits. Analytics engine 50 also determines the category to which the transactions apply (e.g., by group, sub-group, or the like) so that the transactions may be included in a particular liquidity determination.

Outputs 44 represent the format in which analytics engine 50 may output liquidity determinations. In the example shown in FIG. 3, outputs 44 include intraday reporting 52, intraday monitoring 54, intraday forecasting 56, scenario analysis 58, and Basel reports 60. Intraday reporting 52 may represent reports that indicate net liquidity for a variety of different accounts or categories, such as a federal banking account, checking and savings accounts, or the like. Analytics engine 50 may generate intraday reporting 52 on a periodic basis and/or upon initialization by a user.

Intraday monitoring 54 may represent data, graphs, charts, or other representations of a particular liquidity determination, which may be monitored relative at a particular threshold. For example, analytics engine 50 may generate intraday monitoring 54 in real time or near real time during all or a portion of a day. In some examples, analytics engine 50 may generate alerts in instances in which a particular balance being monitored approaches or exceeds a determined threshold.

Intraday forecasting 56 may represent data that indicates a forecast of a particular liquidity amount at a future time that includes transactions that have been received but have not yet posted. For example, analytics engine 50 may perform scenario analysis and stress testing that allow for intraday liquidity to be stress tested in a variety of ways. Analytics engine 50 may perform such analysis and testing using data stored to cash flow warehouse 46 and does not impact current day monitoring (e.g., associated with intraday monitoring 54). In some instances, a user may configure analytics engine 50 to select particular inputs (e.g., such as particular data 40) to be included in the analysis and testing in order to achieve a desired result.

Scenario analysis 58 may represent data that indicates one or more liquidity amounts based on a particular set of events occurring, e.g., based on transactions that may or may not occur in the future. For example, analytics engine 50 may be configured to provide intraday liquidity forecasting capabilities based on historical intraday data (e.g., stored in cash flow warehouse 46). Analytics engine 50 may recalculate intraday real-time forecasts for payment inflows and outflows that are based off historical trends. In some instances, these forecasts may be statistically driven and may include the ability to include management adjustments to one or more accounts based on new information and activity that is known about in advance of such activity occurring. In some examples, scenario analysis 58 may include similar data, graphs, charts, or other representations of a particular liquidity determination as intraday monitoring and may include multiple days of forecast data. Scenario analysis 58 may also include a comparison of forecast results and a representation of one or more future day forecasts based historical data.

Basel reports 60 may represent data that indicates liquidity determinations in a particular reporting format, such as a format required for reporting under the Basel Accords. In other examples, outputs 44 may include more or fewer than those shown in the example of FIG. 3.

Figure 4A:
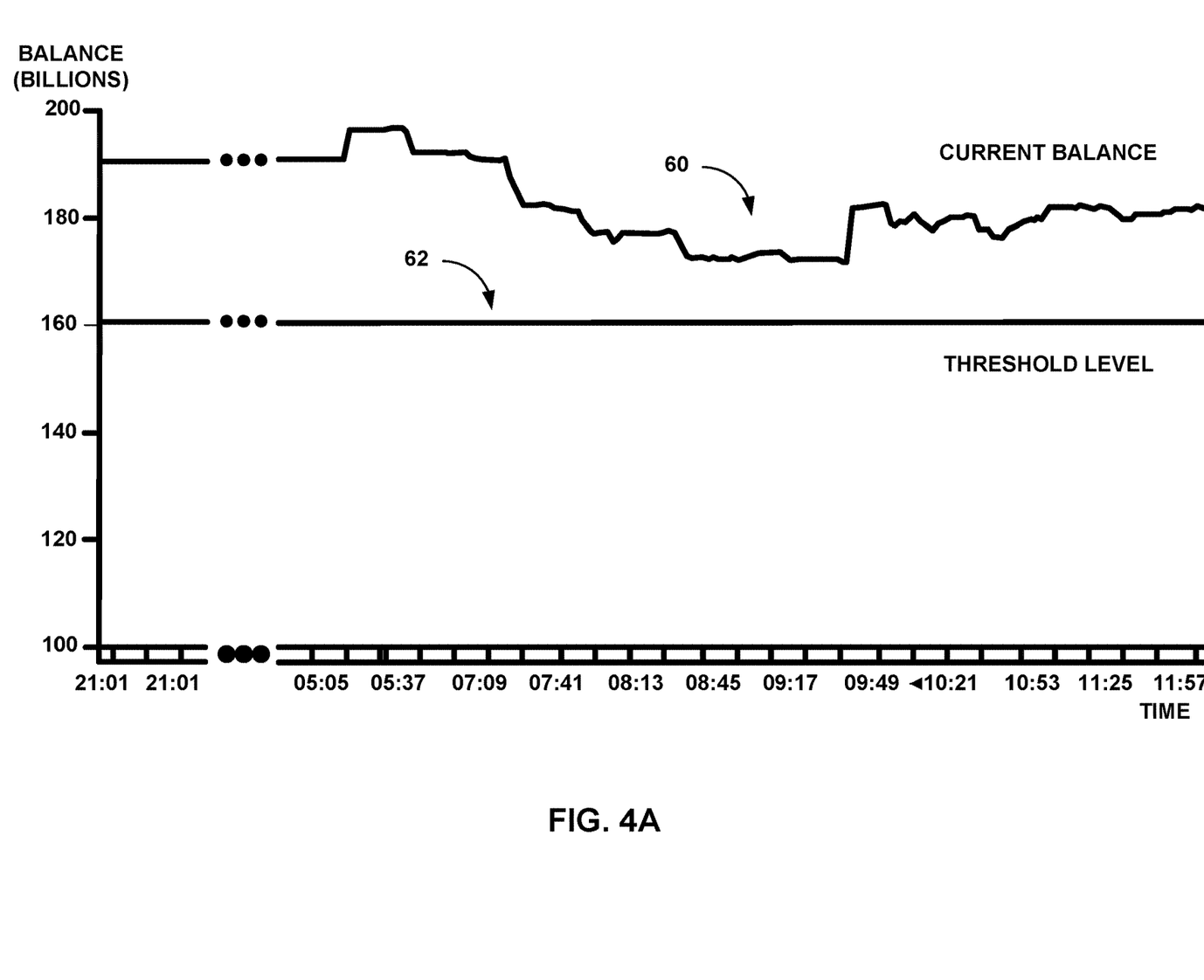
FIG. 4A illustrates a graph of a determined liquidity relative to a threshold liquidity in accordance with the techniques of this disclosure.
Figure 4B:
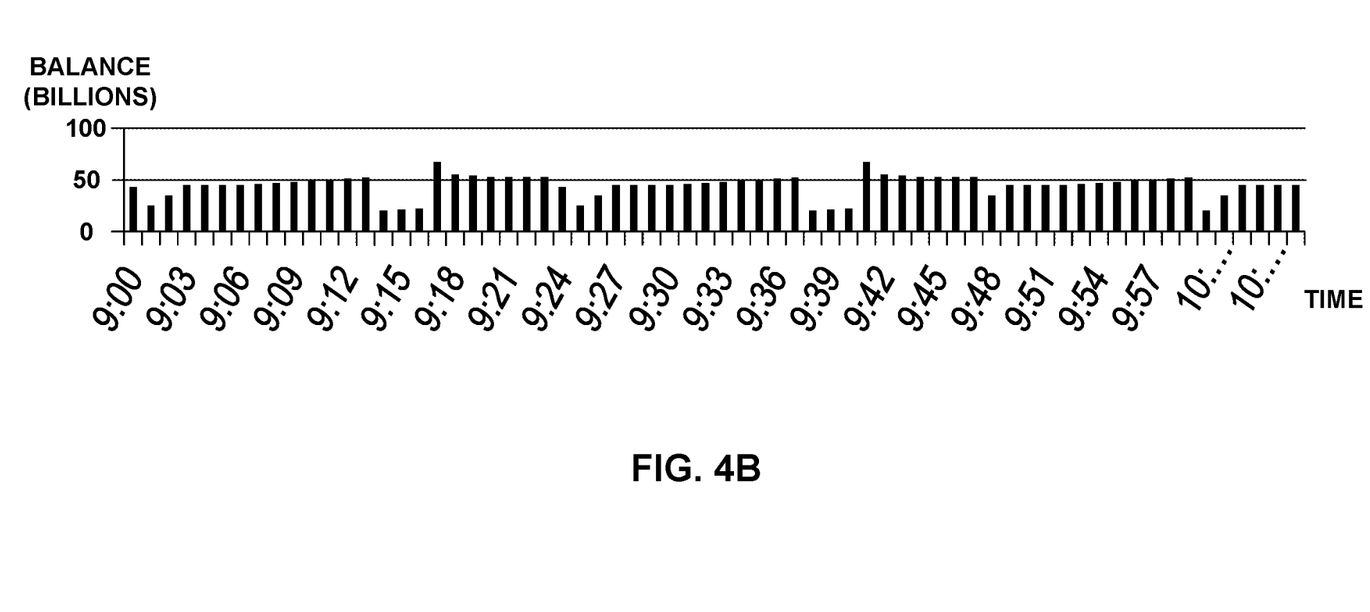
FIG. 4B illustrates a bar graph of a determined liquidity in accordance with the techniques of this disclosure.

FIGS. 4A and 4B illustrate visual representations of a determined liquidity relative to a threshold liquidity in accordance with the techniques of this disclosure. The example of FIG. 4A illustrates a determined intraday net liquidity amount 60 relative to a liquidity threshold 62. In some examples, intraday net liquidity amount 60 may represent a liquidity of a federal banking account. In other examples, intraday net liquidity amount 60 may represent a liquidity associated with a different type of account, such as checking and savings accounts maintained by a financial institution, FDIC insured transactions, or the like. According to aspects of this disclosure, liquidity output unit 20 may issue an alert if the determined intraday net liquidity amount 60 falls below the liquidity threshold 62.

FIG. 4B illustrates a bar graph of a determined liquidity at various times in accordance with the techniques of this disclosure. For example, as described herein, computing device 12 may determine a net liquidity for a particular type of account in real time or near real time and output a representation of the net liquidity (such as the bar graph shown in FIG. 4B) at predetermined intervals. In the example of FIG. 4, a new net liquidity is illustrated every three minutes, although other intervals are also possible.

Figure 5A:
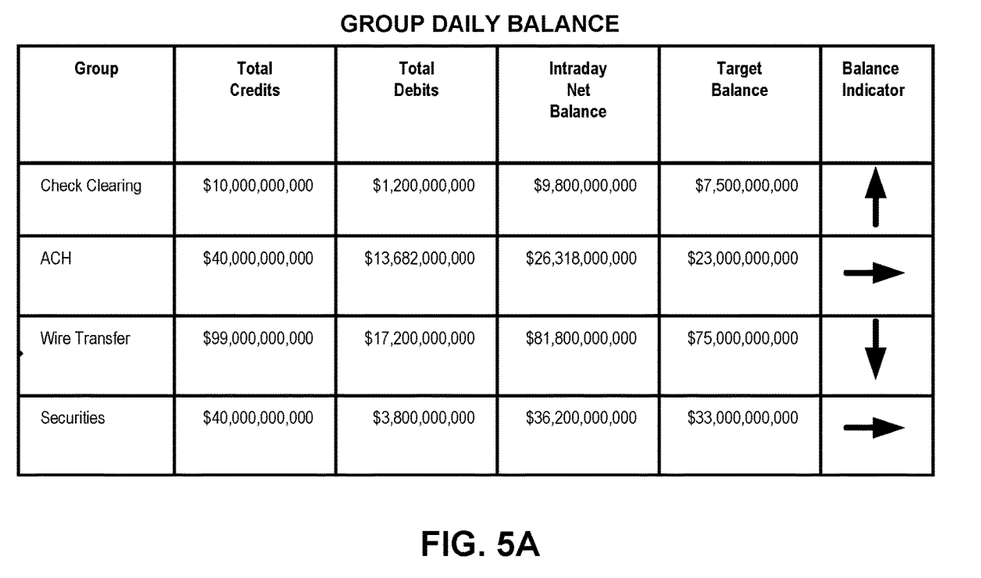
FIG. 5A illustrates a group daily balance table for a number of accounts in accordance with the techniques of this disclosure.

FIG. 5A illustrates a group daily balance table for a number of accounts in accordance with the techniques of this disclosure. According to aspects of this disclosure, computing device 12 (FIG. 1) may determine an intraday net liquidity amount (e.g., an intraday net balance) for a variety of accounts, including, as examples, a check clearing account, an ACH account, a wire transfer account, and a security account. For example, transaction unit 16 may generate the group daily balance table illustrated in FIG. 5A for output to liquidity output unit 20.

Figure 5B:
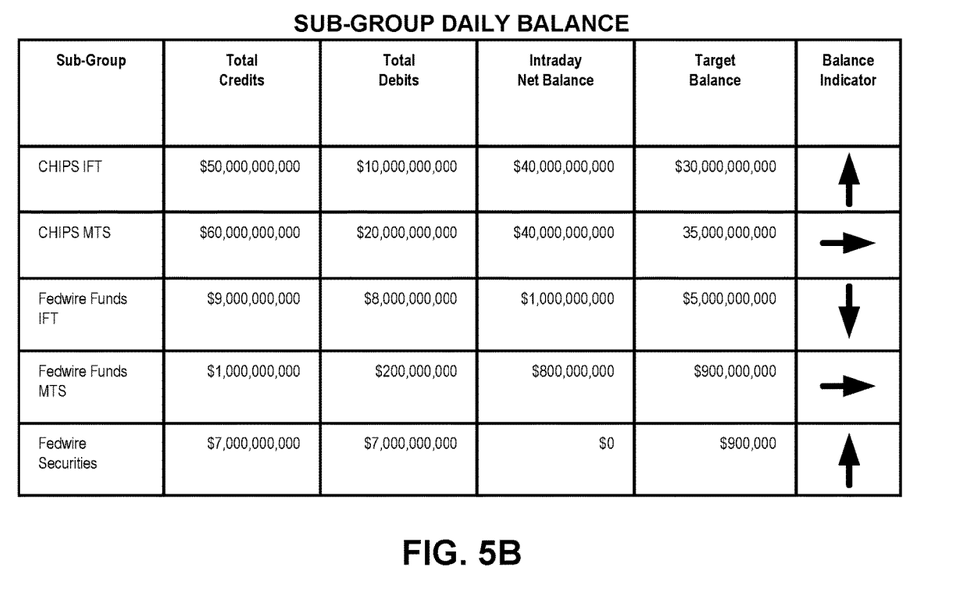
FIG. 5B illustrates a sub-group daily balance table for a number of accounts in accordance with the techniques of this disclosure.

FIG. 5B illustrates a sub-group daily balance table for a number of accounts in accordance with the techniques of this disclosure. According to aspects of this disclosure, computing device 12 (FIG. 1) may determine an intraday net liquidity amount (e.g., an intraday net balance) for one or more sub-groups of a particular account group. The example of FIG. 5B illustrates a sub-group of accounts associated with the wire transfer group of FIG. 5A. In some examples, the target balances illustrated in FIGS. 5A and 5B may be associated with liquidity thresholds.

Figure 6:
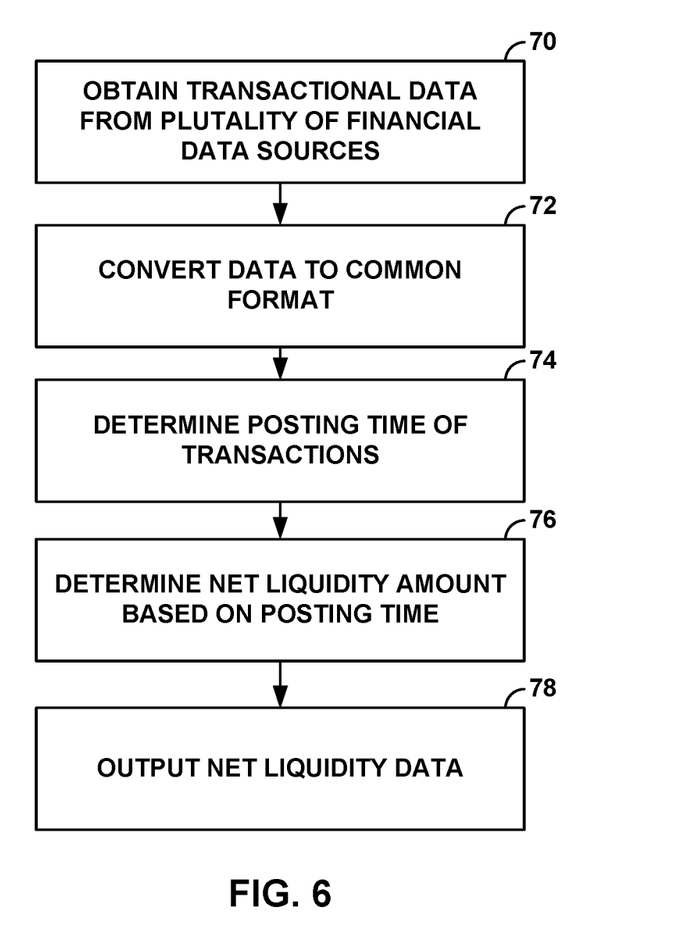
FIG. 6 illustrates an example process for determining net liquidity, according to aspects of this disclosure.

FIG. 6 illustrates an example process for determining net liquidity, according to aspects of this disclosure. While described with respect to computing device 12 (FIG. 1) for purposes of illustration, it should be understood that a variety of other computing devices may be configured to perform the techniques of FIG. 6.

Computing device 12 obtains transactional data from a plurality of financial data sources (70). According to some aspects, computing device 12 obtains transactional data with a per-transaction level of granularity. For example, computing device 12 may obtain data that indicates a number of individual transactions associated with a particular financial account. In other examples, computing device 12 may obtain data that indicates one or more sub-totals of already aggregated transactions.

Computing device 12 may convert the obtained data to a common format (72). For example, computing device 12 may parse the obtained data to determine the source of the data, whether the data indicates a credit or debit, a time of the transactions indicated by the data, or the like. Computing device 12 may parse each field into data elements that are stored to a database.

Computing device 12 may also determine a posting time of transactions indicated by the obtained data (74). For example, transactions of different account types may be posted (e.g., applied to outstanding debts or credits) to the accounts at various times throughout a given day. Some transactions may post in real-time or near real-time (e.g., upon the transaction occurring), while other transactions may post to a particular account at a specified time. In some examples, computing device 12 may determine a posting time for a transaction by mapping the source of the transaction (or the type of transaction) to a table of posting times for different varieties of transactions.

Computing device 12 may determine a net liquidity amount based on the determined posting times. For example, for transactions that post in real-time or near-real time, computing device 12 may include such transactions in the net liquidity amount in real-time or near real-time. In instances in which computing device 12 receives data indicating transactions prior to a posting time, computing device 12 may not include such transactions in the net liquidity amount until the transactions post. Hence, at a given time of day, computing device 12 may determine a net liquidity amount based only on transactions that have posted at the given time and not based on transactions that have occurred but not yet posted. In some instances, computing device 12 may determine the net liquidity amount by aggregating transactional data received from financial data sources 18.

Computing device 12 may output net liquidity data (78). For example, computing device 12 may output data that indicates the determined net liquidity, and may indicate the determined net liquidity relative to a threshold value. In some instances, computing device 12 may generate one or more alerts based on the determined net liquidity relative to the threshold value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method of processing financial data, the method comprising:
    obtaining original transactional data from two or more financial accounts, the original transactional data having two or more file formats;
    converting the original transactional data from the two or more file formats into transactional data having a common format for storage, wherein the common format for the transactional data defines one or more transactions from the two or more financial accounts and associated posting times of the one or more transactions to the two or more financial accounts;
    determining a net liquidity amount for the two or more financial accounts at a given time based on the posting times of the one or more transactions included in the transactional data stored in the common format, wherein determining the net liquidity amount for the two or more financial accounts at the given time comprises:
        determining that a first transaction included in the transactional data stored in the common format has a first posting time prior to the given time,
        determining that a second transaction included in the transactional data stored in the common format has a second posting time after the given time, and
        determining the net liquidity amount for the two or more financial accounts at the given time by including a first value of the first transaction and not including a second value of the second transaction; and
    outputting net liquidity data that is representative of the net liquidity amount for the two or more financial accounts at the given time.

2. The method of claim 1, wherein the original transactional data comprises first transactional data having a first file format and second transactional data from a second financial account having a second file format, wherein converting the original transactional data comprises:
    parsing one or more fields of the first file format of the first transactional data into one or more data elements of the common format for storage, wherein the one or more data elements at least include posting times of one or more transactions to the first financial account; and
    parsing one or more fields of the second file format of the second transactional data into one or more data elements of the common format for storage, wherein the one or more data elements at least include posting times of one or more transactions to the second financial account.

3. The method of claim 1, further comprising storing the transactional data in the common format as one or more data elements in a database.

4. The method of claim 1, wherein determining the net liquidity amount for the two or more financial accounts at the given time comprises determining an intraday net liquidity amount for the two or more financial accounts at each respective time of a plurality of times during a given day.

5. The method of claim 1, wherein determining the net liquidity amount for the two or more financial accounts at the given time comprises aggregating the transactional data from the two or more financial accounts.

6. The method of claim 1, further comprising:
    determining a threshold liquidity amount for the two or more financial accounts;
    comparing the net liquidity amount for the two or more financial accounts at the given time to the threshold liquidity amount; and
    outputting an alert based on the determined net liquidity amount for the two or more financial accounts at the given time being one of above or below the threshold liquidity amount.

7. The method of claim 6, wherein determining the threshold liquidity amount comprises determining the threshold liquidity amount for a given day based on an aggregate opening balance of the two or more financial accounts.

8. The method of claim 6, wherein determining the threshold liquidity amount comprises determining the threshold liquidity amount for a given day based on historical transactional data over a period of time for the two or more financial accounts.

9. A computing device comprising:
    a memory; and
    one or more processors in communication with the memory, the one or more processors configured to:
        obtain original transactional data from two or more financial accounts, the original transactional data having two or more file formats;
        convert the original transactional data from the two or more file formats into transactional data having a common format for storage, wherein the common format for the transactional data defines one or more transactions from the two or more financial accounts and associated posting times of the one or more transactions to the two or more financial accounts;
        determine a net liquidity amount for the two or more financial accounts at a given time based on the posting times of the one or more transactions included in the transactional data stored in the common format, wherein to determine the net liquidity amount for the two or more financial accounts at the given time, the one or more processors are configured to:
            determine that a first transaction included in the transactional data stored in the common format has a first posting time prior to the given time,
            determine that a second transaction included in the transactional data stored in the common format has a second posting time after the given time, and determine the net liquidity amount for the two or more financial accounts at the given time by including a first value of the first transaction and not including a second value of the second transaction; and output net liquidity data that is representative of the net liquidity amount for the two or more financial accounts at the given time.

10. The computing device of claim 9, wherein the original transactional data comprises first transactional data having a first file format and second transactional data from a second financial account having a second file format, wherein to convert the original transactional data, the one or more processors are configured to:

parse one or more fields of the first file format of the first transactional data into one or more data elements of the common format for storage, wherein the one or more data elements at least include posting times of one or more transactions to the first financial account; and parse one or more fields of the second file format of the second transactional data into one or more data elements of the common format for storage, wherein the one or more data elements at least include posting times of one or more transactions to the second financial account.

11. The computing device of claim 9, wherein the one or more processors are configured to store the transactional data in the common format as one or more data elements in a database in the memory.

12. The computing device of claim 9, wherein to determine the net liquidity amount for the two or more financial accounts at the given time, the one or more processors are configured to determine an intraday net liquidity amount for the two or more financial accounts at each respective time of a plurality of times during a given day.

13. The computing device of claim 9, wherein to determine the net liquidity amount for the two or more financial accounts at the given time, the one or more processors are configured to aggregate the transactional data from the two or more financial accounts.

14. The computing device of claim 9, wherein the one or more processors are configured to:

determine a threshold liquidity amount for the two or more financial accounts;

compare the net liquidity amount for the two or more financial accounts at the given time to the threshold liquidity amount; and output an alert based on the determined net liquidity amount for the two or more financial accounts at the given time being one of above or below the threshold liquidity amount.

15. The computing device of claim 14, wherein to determine the threshold liquidity amount, the one or more processors are configured to determine the threshold liquidity amount for a given day based on an aggregate opening balance of the two or more financial accounts.

16. The computing device of claim 14, wherein to determine the threshold liquidity amount, the one or more processors are configured to determine the threshold liquidity amount for a given day based on historical transactional data over a period of time for the two or more financial accounts.

17. A non-transitory computer-readable medium having instructions stored thereon that, when executed, cause one or more processors to:

obtain original transactional data from two or more financial accounts, the original transactional data having two or more file formats;

convert the original transactional data from the two or more file formats into transactional data having a common format for storage, wherein the common format for the transactional data defines one or more transactions from the two or more financial accounts and associated posting times of the one or more transactions to the two or more financial accounts;

determine a net liquidity amount for the two or more financial accounts at a given time based on the posting times of the one or more transactions included in the transactional data stored in the common format, wherein to determine the net liquidity amount for the two or more financial accounts at the given time, the instructions cause the one or more processors to:

determine that a first transaction included in the transactional data stored in the common format has a first posting time prior to the given time, determine that a second transaction included in the transactional data stored in the common format has a second posting time after the given time, and determine the net liquidity amount for the two or more financial accounts at the given time by including a first value of the first transaction and not including a second value of the second transaction; and output net liquidity data that is representative of the net liquidity amount for the two or more financial accounts at the given time.

* * * * *